Dec. 1, 1931.  G. H. MAGRATH  1,834,412

SPINDLE CLUTCH

Filed Jan. 16, 1929

Inventor
George H. Magrath
By Attorneys
Southgate Fay & Harvey

Patented Dec. 1, 1931

1,834,412

UNITED STATES PATENT OFFICE

GEORGE H. MAGRATH, OF WHITINSVILLE, MASSACHUSETTS

SPINDLE CLUTCH

Application filed January 16, 1929. Serial No. 332,978.

This invention relates to a spindle clutch for detachably connecting the bobbin to the spindle of a spinning or twisting machine.

The principal objects of this invention are to provide a construction in which a spring-pressed collar on the spindle operates a series of independent clutch fingers and an integral casing is provided so that this collar need not be fitted closely to the spindle and the moisture due to steam will not be likely to stick the collar to the spindle by means of a film of rust and prevent the proper operation of the clutch.

Other objects and advantages of the invention will appear hereinafter.

Reference is to be had to the accompanying drawings in which

Figure 1:
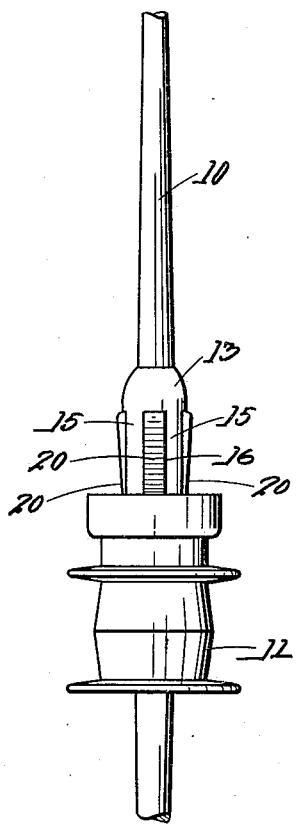
Fig. 1 is a side elevation of a spindle and clutch constituting a preferred embodiment of this invention.
Figure 2:
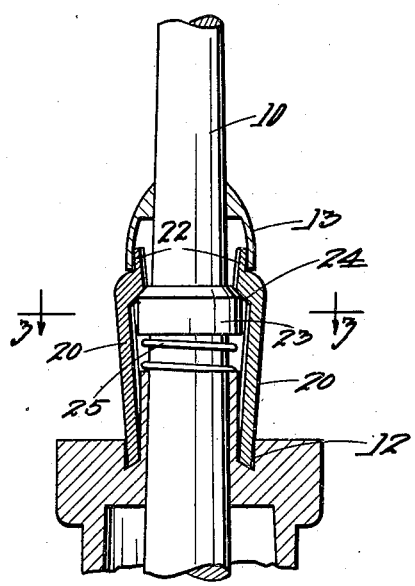
Fig. 2 is a diametrical sectional view of the same.

I am aware of the fact that spindle clutches have been on the market for a number of years in which a collar is slidably mounted on the spindle and pressed upwardly thereon by a spring and this collar is used to operate the clutch fingers. One difficulty of that arrangement has been that the collar had to fit the spindle pretty closely in order to avoid its getting out of center and failing to operate properly. This proved quite a disadvantage as the collar is made of steel like the spindle and as the fit was so tight the moisture of the spinning room and steam in the atmosphere tended to form films of rust which would at times attach the collar to the spindle and prevent any motion of the collar thereon, thus tying the device up and preventing its functioning as it should.

By my construction, however, the collar is held within the casing which is so shaped as to center and hold the collar and therefore the collar can be made to fit the spindle loosely and the danger of its sticking on account of rust due to moisture is very greatly reduced and practically eliminated.

Referring to the drawings I have shown the invention as applied to the usual spindle 10 having a driving member or whorl 11 thereon, provided with an annular recess 12 in its upper surface, concentric with the spindle. Extending upwardly from this recess is a casing 13. This casing is formed of a single piece of metal having an opening at the top fitting the spindle and a plurality of wall portions 15 extending downwardly and adapted to fit at their lower ends within the recess in the whorl. They are spaced apart to provide slots or openings 16.

Within the slots or openings 16 a series of entirely separate spring clutch fingers 20 are mounted. These fingers are provided with offset portions 22 at their upper ends. These offset portions or lugs are on the inner sides and extend under the surface of the casing 13 near the top. This holds the upper ends of these fingers 20 and at the lower ends they are held in the recess 12 into which they project. It will be seen that they normally occupy an inclined position and as their outer surfaces are convex they constitute part of a cone with its base at the top and they are capable of swinging in slightly as usual with these springs to allow the bobbin to be put on and to resist its being taken off. The inner sides 24 of these upwardly extending projections 22 are inclined and bear on the conical edge of the loose collar 23 carried by the spindle and supported by a spring 25 from below. This collar is loosely mounted on the spindle so it has considerable play. Its upper end is coned off and the conical surface fits against the inclined surfaces 24 to keep the collar centered on the spindle.

Figure 4:
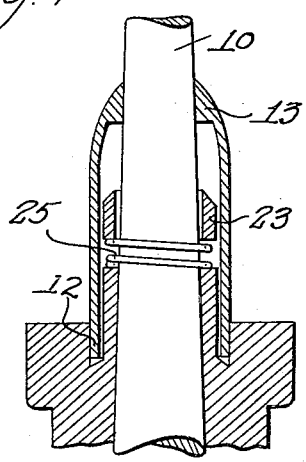
Fig. 4 is a section along the line 4—4 of Fig. 3.
Figure 3:
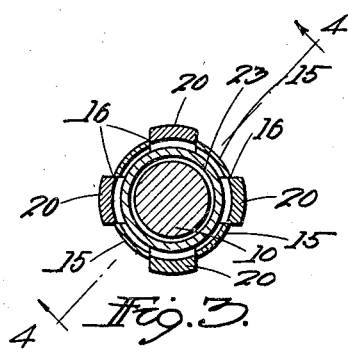
Fig. 3 is a horizontal sectional view on the line 3—3 of Fig. 2.

The important feature of this invention lies in the fact that this casing is held in fixed position and that it holds the collar centrally as shown in Fig. 4 and therefore the collar does not have to fit the spindle tightly. For that reason any little spot of rust that is likely to form on the polished surface of the steel spindle or collar will not be sufficient to stick them together and prevent the collar from moving longitudinally in accordance with the pressure it receives backed up as it is by the spring.

It will be seen also that the slots 16 are just wide enough to receive the fingers 20 and as these fingers have material thickness and do not project out beyond the cylindrical surface of the casing 13 a distance greater than the thickness of this metal there are no spaces provided in which lint and dust can enter and accumulate. Therefore there is no danger of the device being plugged up or rendered inoperative for that reason.

Although I have illustrated and described only one form of the invention I am aware of the fact that modifications can be made therein by any person skilled in the art without departing from the scope of the invention as expressed in the claims. Therefore, I do not wish to be limited in this respect but what I do claim is:—

1. A bobbin clutch comprising a spindle, clutch fingers disposed longitudinally of the spindle and spaced circumferentially thereabout, retaining means for supporting the fingers for movement substantially radially of the spindle, a member disposed within the fingers and having a central opening receiving the spindle, the central opening being sufficiently larger than the spindle to provide for movement of the member along the spindle without substantial engagement with the latter, means providing complementary cam surfaces on the member and on the fingers, means for urging the member along the spindle in a direction to effect engagement of these cam surfaces and thereby to urge the fingers outwardly, and means for guiding the member for movement along the spindle and substantially out of engagement therewith.

2. A bobbin clutch comprising a spindle, driving and casing members carried by the spindle and having opposed finger retaining recesses therein, fingers disposed longitudinally of the spindle and spaced circumferentially thereabout, the fingers being mounted in the opposed finger retaining recesses of the driving and casing members, an actuating member disposed within the fingers and having a central opening receiving the spindle and sufficiently larger than the latter to provide for movement therealong without substantial engagement therewith, means providing complementary cam surfaces on this member and on the fingers, means for urging the actuating member along the spindle in a direction to effect engagement of the cam surfaces and thereby to urge the fingers outwardly and means carried by one of said driving and casing members for guiding the actuating member for movement along the spindle without substantial engagement therewith.

3. A bobbin clutch comprising a spindle, driving and casing members carried by the spindle and having opposed finger retaining recesses therein, fingers disposed longitudinally of the spindle and spaced circumferentially thereabout, the fingers being mounted in the opposed finger retaining recesses of the driving and casing members, an actuating member disposed within the fingers and having a central opening receiving the spindle and sufficiently larger than the latter to provide for movement therealong without substantial engagement therewith, means providing complementary cam surfaces on this member and on the fingers, means for urging the actuating member along the spindle in a direction to effect engagement of the cam surfaces and thereby to urge the fingers outwardly, and means disposed between the fingers and extending substantially between the driving and casing members and carried by one of the latter members for guiding the actuating member along the spindle substantially free from engagement with the latter.

4. A bobbin clutch comprising a spindle, driving and casing members carried thereby, these members having opposed finger retaining recesses, the casing member having circumferentially spaced and longitudinally disposed finger receiving slots forming intervening longitudinally disposed guide members, the latter having interior guide surfaces substantially concentric with the spindle, fingers mounted in the opposed recesses and disposed in the slots, a substantially annular member disposed about the spindle and within the fingers, the annular member having substantially concentric inner and outer surfaces, the inner of these surfaces being of sufficient diameter to provide for movement along the spindle without substantial engagement therewith, the outer of these surfaces having a diameter approximating that of the interior guide surfaces of the guide members so that the latter may be effective for guiding the annular member along the spindle without substantial engagement therewith, means providing complementary cam surfaces on the annular member and on the fingers, and means for urging the annular member along the spindle in a direction to effect engagement of these cam surfaces and thereby to urge the fingers yieldably outward for engagement with a bobbin.

5. A bobbin clutch comprising a spindle, driving and casing members affixed to the spindle and having opposed finger retaining recesses therein, fingers spaced circumferentially about the spindle and disposed longitudinally thereof with their end portions disposed in the opposed recesses, means for holding the respective upper and lower ends of the fingers from displacement circumferentially of the spindle while providing for movement of these fingers substantially radially of the spindle, a substantially annular expander member disposed within the fingers and about the spindle in slidable relation with respect to the latter, means providing cooperating cam surfaces on the annular expander member and on the fingers for moving the latter outwardly, and means for urging the annular expander member along the spindle in a direction to effect outward movement of the fingers, said first means comprising portions of said casing member which extend between said fingers in juxtaposition to the outer periphery of said expander member and the inner periphery of the expander member being loose on the spindle, whereby the expander member may move longitudinally of the device without binding under adverse conditions of usage.

6. A bobbin clutch comprising a spindle, driving and casing members, affixed to the spindle and having opposed finger retaining recesses therein, fingers spaced circumferentially about the spindle and disposed longitudinally thereof with their end portions disposed in the opposed recesses, means rigid with the spindle and extending substantially from the upper ends of the fingers downwardly along and in slidable engagement with the fingers for a considerable portion of the length thereof for holding these fingers from displacement circumferentially of the spindle while providing for substantially radial movement thereof, means within the fingers and slidable along the spindle for moving the fingers outwardly, and means for urging the last mentioned means in a direction to effect outward movement of the fingers, said first means comprising portions of said casing member which extend between said fingers in juxtaposition to the outer periphery of said expander member and the inner periphery of the expander member being loose on the spindle, whereby the expander member may move longitudinally of the device without binding under adverse conditions of usage.

7. A bobbin clutch comprising a spindle, driving and casing members, affixed to the spindle and having opposed finger retaining recesses therein, fingers spaced circumferentially about the spindle and disposed longitudinally thereof with their end portions disposed in the opposed recesses, means carried by the casing member and extending between and in slidable engagement with the fingers substantially to the driving member for holding the fingers from displacement circumferentially of the spindle while providing for substantially radial movement of the fingers, means within the fingers and slidable along the spindle for moving the fingers outwardly, and means for urging the last mentioned means in a direction to effect outward movement of the fingers, said first means comprising portions of said casing member which extend between said fingers in juxtaposition to the outer periphery of said expander member and the inner periphery of the expander member being loose on the spindle, whereby the expander member may move longitudinally of the device without binding under adverse conditions of usage.

In testimony whereof I have hereunto affixed my signature.

GEORGE H. MAGRATH.